(12) United States Patent
Jang et al.

(10) Patent No.: US 12,450,853 B2
(45) Date of Patent: Oct. 21, 2025

(54) METHOD AND SYSTEM FOR GENERATING VIRTUAL CONTENT

(71) Applicant: LINE Plus Corporation, Seongnam-si (KR)

(72) Inventors: Hyukjae Jang, Seongnam-si (KR); Hoyoung Cho, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 202 days.

(21) Appl. No.: 18/356,318

(22) Filed: Jul. 21, 2023

(65) Prior Publication Data

US 2024/0062497 A1    Feb. 22, 2024

(30) Foreign Application Priority Data

Aug. 18, 2022   (KR) .................. 10-2022-0103488

(51) Int. Cl.
  *G06T 19/20*   (2011.01)
  *G06T 7/194*   (2017.01)
  *G06T 7/20*    (2017.01)
  *G06T 7/70*    (2017.01)

(52) U.S. Cl.
  CPC ............. *G06T 19/20* (2013.01); *G06T 7/194* (2017.01); *G06T 7/20* (2013.01); *G06T 7/70* (2017.01); *G06T 2219/2004* (2013.01)

(58) Field of Classification Search
  CPC ............................... G06T 13/40; G06T 19/20
  See application file for complete search history.

(56) References Cited

U.S. PATENT DOCUMENTS

| | | | |
|---|---|---|---|
| 11,250,626 B1* | 2/2022 | Ding | ............... G06T 7/11 |
| 2013/0016124 A1* | 1/2013 | Han | ............... A63F 13/655 |
| | | | 345/619 |
| 2020/0306640 A1 | 10/2020 | Kolen et al. | |
| 2022/0366653 A1* | 11/2022 | Sung | ............... G06T 7/73 |

FOREIGN PATENT DOCUMENTS

| | | |
|---|---|---|
| KR | 10-2020-0115231 A | 10/2020 |
| KR | 10-2021-0155575 A | 12/2021 |

OTHER PUBLICATIONS

Volonte et al., Effects of a Virtual Human Appearance Fidelity Continuum on Visual Attention in Virtual Reality, Proceedings of the 19th ACM International Conference on Intelligent Virtual Agents, Jul. 2019, pp. 141-147 (Year: 2019).*

* cited by examiner

*Primary Examiner* — Charles Tseng
(74) *Attorney, Agent, or Firm* — Harness, Dickey & Pierce, P.L.C.

(57) ABSTRACT

A method for generating virtual content is provided, which is performed by one or more processors, and includes receiving video content, extracting first motion data of a first object included in the video content, and converting the video content in accordance with a first virtual environment based on the extracted first motion data of the first object so as to generate virtual content in the first virtual environment.

17 Claims, 10 Drawing Sheets

410　　　　　　　420　　　　　　　430

METHOD AND SYSTEM FOR GENERATING VIRTUAL CONTENT

CROSS-REFERENCE TO RELATED APPLICATION

This application claims priority under 35 U.S.C § 119 to Korean Patent Application No. 10-2022-0103488, filed in the Korean Intellectual Property Office on Aug. 18, 2022, the entire contents of which are hereby incorporated by reference.

BACKGROUND

Technical Field

The present disclosure relates to a method and/or system for generating virtual content. For example, at least some example embodiments relate to a method and/or system capable of generating virtual content in one or more virtual environments by converting video content in accordance with respective ones of the one or more virtual environments.

Description of the Related Art

The emergence of new information technology (IT) technologies such as artificial intelligence, the Internet of Things, blockchain, etc., and shifts to non-contact environments in many parts of daily life due to the spread of infectious diseases, etc. have resulted in rapid change in the service environment. In particular, in recent years, metaverse technology is attracting attention, which enables people to experience social, cultural, and economic activities, that used to take place in the real world, in an online virtual environment. In the virtual environment inside the metaverse service, users can conduct cultural, economic, and social activities on the metaverse just like in the real world, such as holding meetings, playing mini-games, etc. In addition, providers of the metaverse services may provide various contents by using the virtual environment inside the metaverse service.

According to the user's needs or preferences, there is an increasing need to provide various contents using the virtual environment inside the metaverse service. Meanwhile, the virtual environment of the metaverse service is implemented with 3D computer graphics. Specifically, the conventional method for implementing a virtual environment using 3D computer graphics involves creating 3D models for the structure of objects or/and backgrounds, and applying textures to the generated 3D models. Consequently, if one intends to change the graphic style of a virtual environment created using conventional method, it may require recreating the 3D modeling, resulting in significant costs and efforts. Given the substantial costs and efforts associated with generating virtual environments using 3D computer graphics, there is a problem that it is difficult to provide a virtual environment with various graphic styles according to the user's needs or preferences.

SUMMARY

In order to solve the problems described above, the present disclosure provides a method and/or apparatus such as a system for generating virtual content.

The present disclosure may be implemented in a variety of ways, including a method, a device (e.g., a system) or a computer program stored in a readable storage medium.

Some example embodiments relate to a method of generating virtual content by one or more processors. In some example embodiments, the method includes receiving video content; extracting, by the one or more processors, first motion data of a first object included in the video content; and converting, by the one or more processors, the video content in accordance with a first virtual environment based on the first motion data of the first object to generate the virtual content in the first virtual environment.

In some example embodiments, the first motion data includes at least one of position information, posture information, or motion information of the first object.

In some example embodiments, the extracting the first motion data comprises: determining a first extraction level based on a graphic style of the first virtual environment; and extracting the first motion data of the first object based on the first extraction level.

In some example embodiments, the method further includes modifying the first motion data of the first object based on an expressible range in the first virtual environment.

In some example embodiments, the generating the virtual content in the first virtual environment comprises: generating second motion data in the first virtual environment based on the first motion data.

In some example embodiments, the generating second motion data in the first virtual environment comprises: inputting the first motion data to a first machine learning model.

In some example embodiments, the first machine learning model is a machine learning model trained with first training data and second training data to generate the second motion data in the first virtual environment, the first training data includes motion data extracted from the video content for training, and the second training data includes motion data for training in the first virtual environment.

In some example embodiments, the generating the virtual content in the first virtual environment further comprises: generating, in the first virtual environment, a second object that corresponds to the first object, the second object being an object in a graphic style of the first virtual environment; and applying the second motion data to the second object.

In some example embodiments, the generating the second object in the first virtual environment comprises: inputting data associated with the first object into a second machine learning model, wherein the second machine learning model includes a generator network that converts an object included in a live image into a graphic style of the first virtual environment so as to generate a 3D object, and a discriminator network that determines whether the 3D object generated by the generator network is the graphic style of the first virtual environment.

In some example embodiments, the method further includes extracting third motion data of the first object included in the video content; and converting the video content in accordance with a second virtual environment based on the third motion data to generate the virtual content in the second virtual environment.

In some example embodiments, a graphic style of the first virtual environment, and a graphic style of the second virtual environment are different from each other, and the first motion data and the third motion data are different from each other.

In some example embodiments, the extracting the third motion data comprises: determining a second extraction level based on a graphic style of the second virtual environment; and extracting the third motion data of the first object based on the second extraction level.

In some example embodiments, the generating the virtual content in the second virtual environment comprises: generating fourth motion data in the second virtual environment based on the third motion data.

In some example embodiments, the generating the virtual content in the second virtual environment comprises: generating, in the second virtual environment, a third object that corresponds to the first object, the third object being an object in a graphic style of the second virtual environment; and applying the fourth motion data to the third object.

In some example embodiments, the method further includes extracting first background data included in the video content; and generating, in the first virtual environment, second background data based on the first background data, the second background data being 3D background data in a graphic style of the first virtual environment, wherein the generating the virtual content in the first virtual environment includes generating the virtual content in the first virtual environment based on the first motion data of the first object and the second background data.

In some example embodiments, the extracting the first background data comprises determining a third extraction level based on the graphic style of the first virtual environment; and extracting the first background data from the video content based on the third extraction level.

In some example embodiments, the method further comprises extracting third background data included in the video content; and generating, in the second virtual environment, fourth background data based on the third background data, the fourth background data being 3D background data in a graphic style of the second virtual environment, wherein the generating the virtual content in the second virtual environment includes generating the virtual content in the second virtual environment based on the third motion data of the first object and the fourth background data.

In some example embodiments, the extracting the third background data comprises: determining a fourth extraction level based on the graphic style of the second virtual environment; and extracting the third background data from the video content based on the fourth extraction level.

Some example embodiments relate to a non-transitory computer-readable recording medium storing instructions that, when executed by a computer, configure the computer to execute the method of generating virtual content by one or more processors.

Some example embodiments relate to an information processing system. In some example embodiments, the information processing system includes a communication module; a memory; and one or more processors connected to the memory and configured to execute one or more computer-readable programs included in the memory to configure the information processing system to, receive video content; extract first motion data of a first object included in the video content; and convert the video content in accordance with a first virtual environment based on the first motion data of the first object to generate virtual content in the first virtual environment.

According to various examples of the present disclosure, by providing virtual contents of different methods of expression in accordance with graphic styles based on live image or live video, it is possible to produce various contents efficiently.

According to various examples of the present disclosure, by generating virtual content by converting graphic styles in a plurality of virtual environments based on a live image or live video, it is possible to reduce the cost and effort of generating a 3D space.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
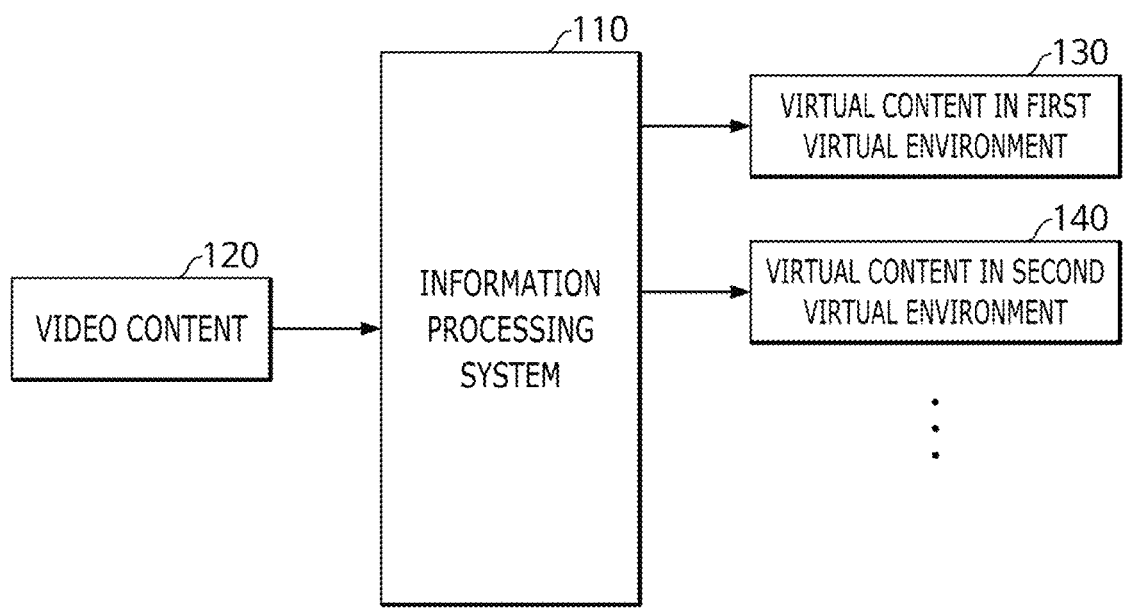
FIG. 1 is a diagram illustrating an example of a method for generating virtual content in a virtual environment based on video content by an information processing system.

Hereinafter, example embodiments will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, "each of a plurality of A" may refer to each of all components included in the plurality of A, or may refer to each of some of the components included in a plurality of A.

In the present disclosure, a "virtual environment" is a virtual space implemented with 3D graphics and may refer to a virtual space in which one or more users (or user accounts) can participate. The user may control the user's avatar to move in the virtual space, and communicate with other users through chats, phone calls, video calls, etc. The user may watch the content provided in the virtual space.

FIG. 1 is a diagram illustrating an example of a method for generating virtual contents 130 and 140 in respective virtual environments based on a video content 120 by an information processing system 110.

Referring to FIG. 1, the information processing system 110 may be a system that provides a service for generating the virtual contents 130 and 140 in a plurality of virtual environments using the video content 120. For example, the information processing system 110 may receive the video content 120 and convert the received video content 120 in accordance with each of the plurality of virtual environments so as to generate the virtual contents 130 and 140 in a plurality of virtual environments.

FIG. 1 illustrates an example of the virtual contents 130 and 140 in a plurality of virtual environments, and illustrates the virtual content 130 in the first virtual environment and the virtual content 140 in a second virtual environment, but aspects are not limited thereto, and the information processing system 110 may generate more types of virtual contents in different virtual environments based on one video content 120. For example, the first virtual environment may be a cartoon style virtual environment, the second virtual environment may be a fantasy style virtual environment, and a third virtual environment may be a toy block style virtual environment.

The information processing system 110 may receive the video content 120. The video content 120 may include a live video or live image content in a 2D or 3D format. For example, the video content 120 may be a live video or live image content including one or more objects of the real world, and may include movie, music video, and sports game content, but is not limited thereto. In another example, the video content 120 may include streaming content obtained by filming the real world and transmitted in real time. For example, it may include real-time sports broadcast content, live concert content, live broadcast content, etc. The types of the video content 120 may vary, and the types and contents of the video content 120 are not limited to the examples described above.

The information processing system 110 may generate, based on the video content 120, the virtual contents 130 and 140 in a plurality of virtual environments. In this case, the virtual contents 130 and 140 in the plurality of virtual environments may be virtual environments implemented in different graphic styles. For example, the virtual content 130 in the first virtual environment of a plurality of virtual environments may be implemented in the cartoon style graphic style that is expressed by transforming and distorting the shape, size, proportion, texture, etc. of an object. In addition, the virtual content 140 in the second virtual environment of a plurality of virtual environments may be implemented in a realistic style graphic style that realistically expresses the shape, size, proportion, texture, etc. of an object. The graphic style for each of the plurality of different virtual environments is not limited to the examples described above, and the plurality of different virtual environments may be implemented in various graphic styles according to the degree of deformation of the shape, size, proportion, texture, etc. of the object. In addition, the virtual contents 130 and 140 in the plurality of virtual environments may include 2D format or 3D format video contents or image contents, but are not limited to, and the virtual contents 130 and 140 in the plurality of virtual environments may include video content or image content in a 4D format. For example, the information processing system 110 may generate, based on the 2D video content, 2D virtual content implemented in different graphic styles in a plurality of virtual environments. In another example, the information processing system 110 may generate, based on the 2D video content, 3D virtual content (or 4D virtual content) implemented in different graphic styles in a plurality of virtual environments. In still another example, the information processing system 110 may generate, based on the 3D video content, 3D virtual content (or 4D virtual content) implemented in different graphic styles in a plurality of virtual environments. With this configuration, a virtual environment implemented in various graphic styles can be automatically generated. In this case, the process of performing 3D modeling by humans to create a virtual environment implemented in different graphic styles can be omitted. As a result, virtual environment service providers can reduce costs and efforts in generating virtual environments implemented in various graphic styles according to the user's preferences.

Figure 2:
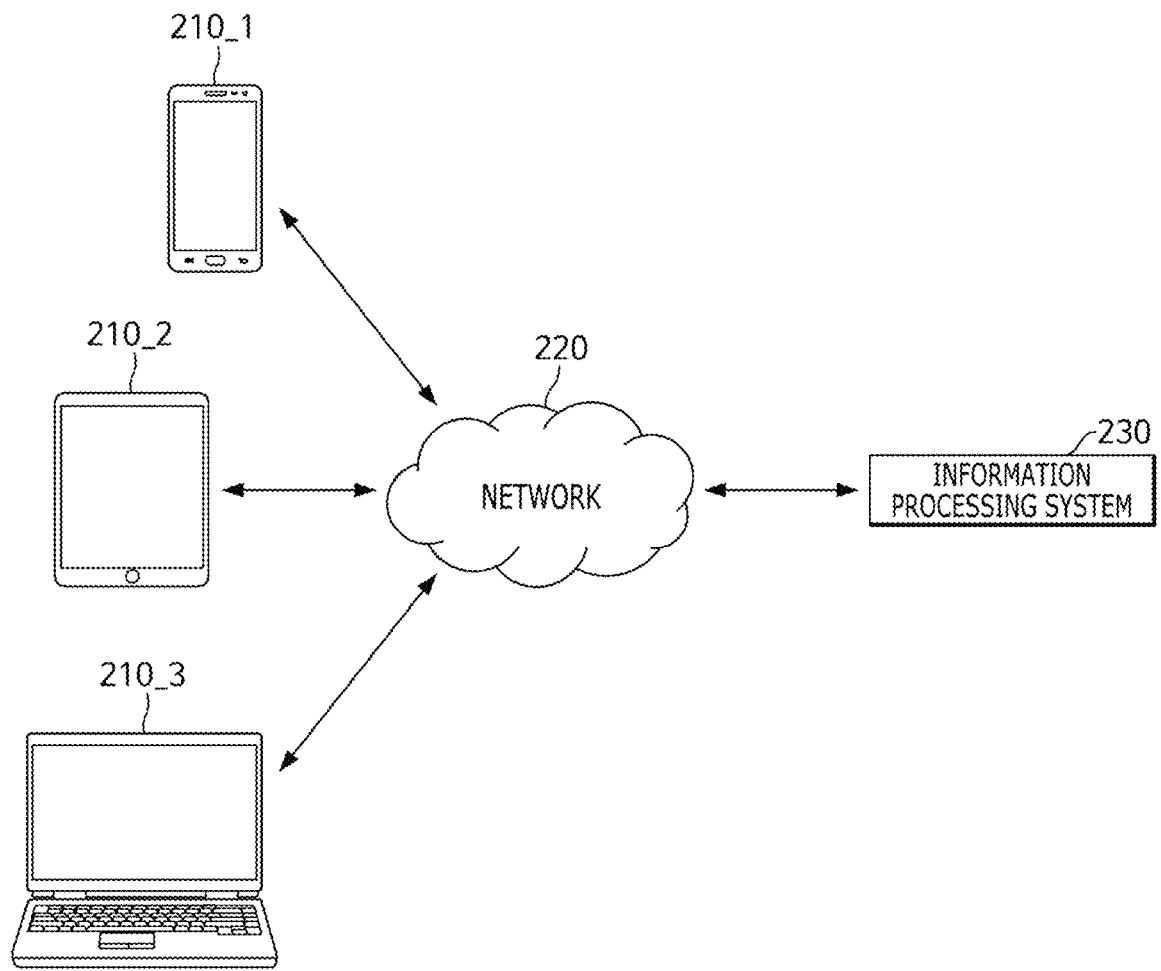
FIG. 2 schematically illustrates a configuration in which an information processing system 230 is communicatively connected to a plurality of user terminals to provide a service for generating virtual content.

FIG. 2 schematically illustrates a configuration in which the information processing system 230 is communicatively connected to a plurality of user terminals 210_1, 210_2, and 210_3 to provide the service for generating virtual content.

Referring to FIG. 2, as illustrated, the plurality of user terminals 210_1, 210_2, and 210_3 may be connected to the information processing system 230 that is capable of generating and providing the virtual content through a network 220. The plurality of user terminals 210_1, 210_2, and 210_3 may include a terminal of a user receiving the virtual content.

The information processing system 230 may include one or more server devices and/or databases, or one or more distributed computing devices and/or distributed databases based on cloud computing services that can store, provide and execute computer-executable programs (e.g., downloadable applications) and data associated with the service for generating and providing the virtual content, etc. The service for generating and providing virtual content provided by the information processing system 230 may be provided to the user through virtual environment applications, etc. installed in each the plurality of user terminals 210_1, 210_2, and 210_3.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, etc.) that may be included in the network 220 as well as short-range wireless communication between the user terminals 210_1, 210_2, and 210_3, but aspects are not limited thereto.

In FIG. 2, the mobile phone terminal 210_1, the tablet terminal 210_2, and the PC terminal 210_3 are illustrated as the examples of the user terminals, but example embodiments are not limited thereto, and the user terminals 210_1, 210_2, and 210_3 may be any computing device that is capable of wired and/or wireless communication and that can be installed with the virtual environment application, the web browser, or the like and execute the same. For example, the user terminal may include an AI speaker, a smart phone, a mobile phone, a navigation, a computer, a notebook, a digital broadcasting terminal, a personal digital assistant (PDA), a portable multimedia player (PMP), a tablet PC, a game console, a wearable device, an Internet of Things (IoT) device, a virtual reality (VR) device, an augmented reality (AR) device, a set-top box, etc. In addition, FIG. 2 illustrates that three user terminals 210_1, 210_2, and 210_3 are in communication with the information processing system 230 through the network 220, but example embodiments are not limited thereto, and a different number of user terminals may be configured to be in communication with the information processing system 230 through the network 220.

Figure 3:
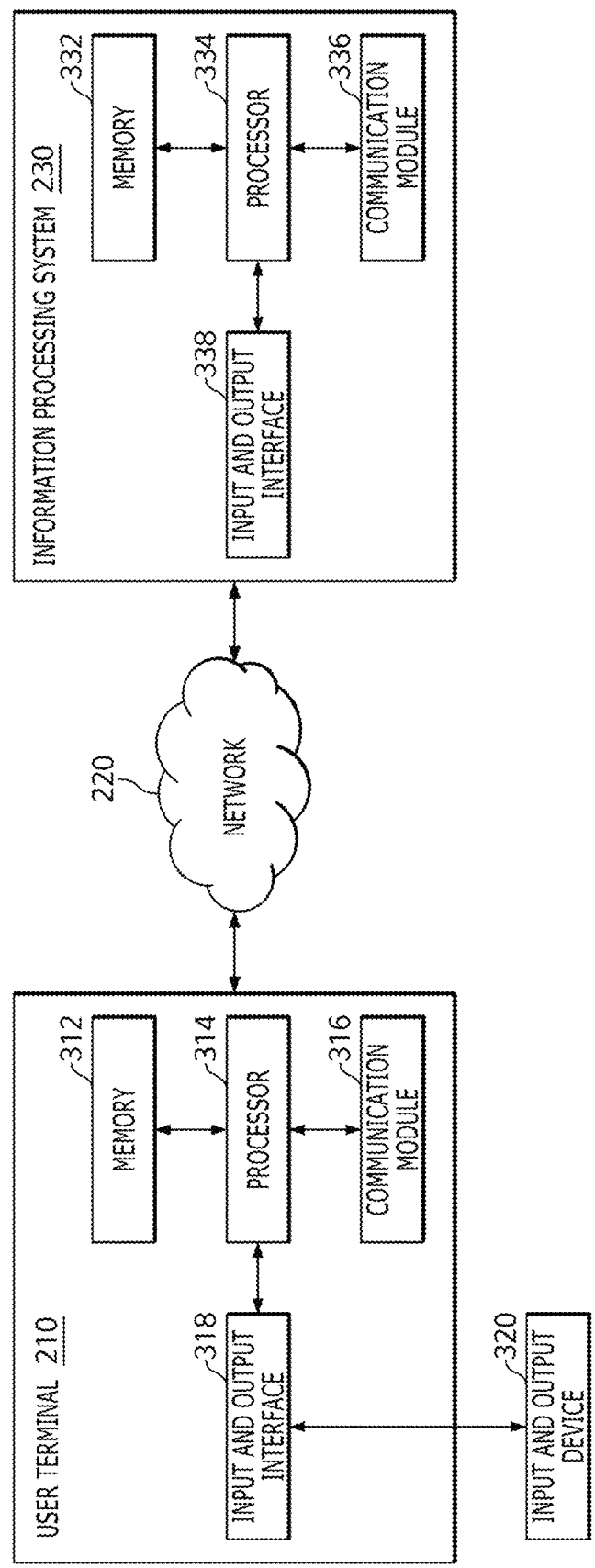
FIG. 3 is a block diagram of an internal configuration of the user terminal and the information processing system.

FIG. 3 is a block diagram of an internal configuration of the user terminal 210 and the information processing system 230.

Referring to FIG. 3, the user terminal 210 may refer to any computing device that is capable of executing the application, web browsers, etc., and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using respective communication modules 316 and 336. In addition, an input and output device 320 may be configured to input information and/or data to the user terminal 210 or output information and/or data generated from the user terminal 210 through the input and output interface 318.

The memories 312 and 332 may include any non-transitory computer-readable recording medium. The memories 312 and 332 may include a permanent mass storage device such as read only memory (ROM), disk drive, solid state drive (SSD), flash memory, etc. As another example, a non-destructive mass storage device such as ROM, SSD, flash memory, disk drive, etc. may be included in the user terminal 210 or the information processing system 230 as a separate permanent storage device that is distinct from the memory. In addition, an operating system and at least one program code may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, etc., for example. As another example, the software components may be loaded into the memories 312 and 332 through the communication modules 316 and 336 rather than the computer-readable recording medium. For example, at least one program may be loaded into the memories 312 and 332 based on a computer program installed by files provided by developers or a file distribution system that distributes an installation file of an application via the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The processors 314 and 334 may be considered a type of processing circuitry and such processing circuitry may include hardware including logic circuits; a hardware/software combination such as at least one processor executing software; or a combination thereof. For example, such hardware may include, but is not limited to, a CPU, an arithmetic logic unit (ALU), a digital signal processor, a microcomputer, FPGA, a System-on-Chip (SoC), a programmable logic unit, a microprocessor, ASIC, etc., or any combination thereof.

For example, through the execution of the instructions, the processors 314 and 334 may be transformed into special purpose processors to generate, from a live image or live video, virtual content by converting graphic styles in a plurality of virtual environments. The special purpose processors 314 and 334 may improve the functioning of the user terminal 210 and the information processing system 230 themselves by, for example, reducing the cost and effort of generating a 3D space by producing various contents efficiently. For example, the special purpose processor 334 included in the information processing system 230 may generate and apply motion data, separately generate background data in the specific virtual environment, and merge the object with the motion data applied thereto in the specific virtual environment with the background data in the specific virtual environment so as to generate virtual content in the specific virtual environment.

According to embodiments, the processing circuitry may perform some operations by artificial intelligence and/or machine learning. As an example, the processing circuitry may implement an artificial neural network that is trained on a set of training data by, for example, a supervised, unsupervised, and/or reinforcement learning model, and wherein the processing circuitry may process a feature vector to provide output based upon the training Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to generate virtual content, etc.) generated by the processor 314 of the user terminal 210 according to the program code stored in the recording device such as the memory 312 or the like may be transmitted to the information processing system 230 via the network 220 under the control of the communication module 316. Conversely, a control signal or command provided under the control of the processor 334 of the information processing system 230 may be received by the user terminal 210 through the communication module 316 of the user terminal 210 through the communication module 336 and the network 220. For example, the user terminal 210 may receive the virtual content etc. in the virtual environment from the information processing system 230.

The input and output interface 318 may be a means for interfacing with the input and output device 320. As an example, the input device may include a device such as a camera including an audio sensor and/or an image sensor, a keyboard, a microphone, a mouse, etc., and the output device may include a device such as a display, a speaker, a haptic feedback device, etc. As another example, the input and output interface 318 may be a means for interfacing with a device such as a touch screen or the like that integrates a configuration or function for performing inputting and outputting. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, etc. For example, if the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, etc. are further included in the user terminal 210.

Figure 4:
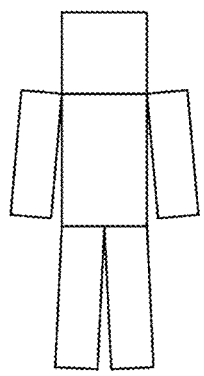
FIG. 4 is a diagram illustrating examples of graphic styles in different virtual environments.
Figure 4:
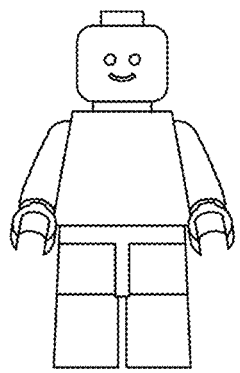
Figure 4:
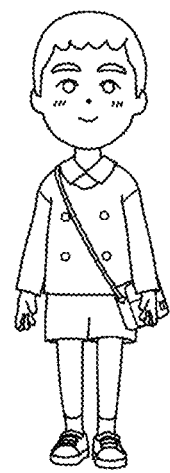

FIG. 4 is a diagram illustrating examples of graphic styles 410, 420, and 430 in different virtual environments.

Referring to FIGS. 3 and 4, the processor 334 of the information processing system may generate, based on video content, virtual content in a virtual environment of a specific graphic style. In this case, object(s) depicted in the virtual content in the virtual environment may correspond to object(s) depicted in video content. In addition, object(s) depicted in the virtual content in the virtual environment of the specific graphic style may be object(s) depicted in video content implemented in the specific graphic style.

The graphic styles 410, 420, and 430 may indicate a method of expression, according to which the shape, size, ratio, texture, etc. of object(s) depicted in the video content are transformed and applied to the virtual content. For example, the first graphic style 410 may be a method of expression, according to which the shape, size, proportion, and texture of object(s) depicted in video content are simply transformed into a box style and applied to the virtual environment. In addition, the second graphic style 420 may be a method of expression, according to which the shape, size, proportion, and texture of the object(s) depicted in video content are transformed so as to look like a toy block, and applied to the virtual content. In addition, the third graphic style 430 may be a method of expression, according to which the shape, size, proportion, and texture of the object(s) depicted in the video content are transformed into a cartoon form and applied to the virtual content. The graphic styles 410, 420, and 430 are not limited to the examples described above and may be expressed in the virtual environment in various ways. FIG. 4 illustrates examples in which a "person" object is expressed in different styles in different virtual environments, but aspects are not limited thereto, and various objects other than the "person" object, such as a "car" object, an "animal" object, a "building" object, a "background" object may be expressed in different styles in each virtual environment.

Figure 5:
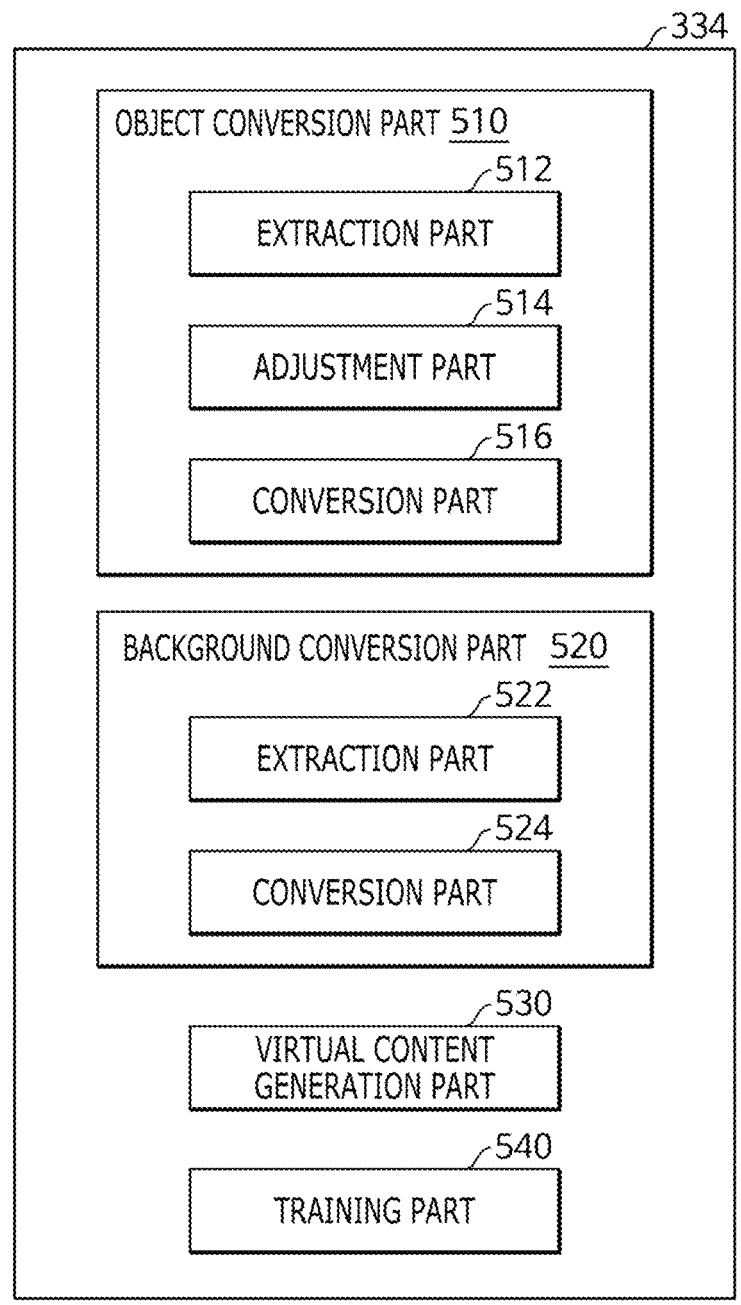
FIG. 5 is a block diagram illustrating an internal configuration of an information processing system.

FIG. 5 is a block diagram illustrating an internal configuration of the information processing system.

Referring to FIGS. 3 and 5, as illustrated, the processor 334 of the information processing system may execute computer readable code that transforms the processor 334 into a special purpose computer to perform the functions of an object conversion part 510, a background conversion part 520, a virtual content generation part 530, and a training part 540. The object conversion part 510 may include an extraction part 512, an adjustment part 514 and a conversion part 516. In addition, the background conversion part 520 may include an extraction part 522 and a conversion part 524.

The processor 334, when performing the functions of the object conversion part 510, may generate motion data in a specific virtual environment necessary for the generation of virtual content, based on motion data of an object extracted from the video content. In addition, the processor 334, when performing the functions of the object conversion part 510, may generate an object in a specific virtual environment corresponding to an object included in video content.

Specifically, the processor 334, when performing the functions of the extraction part 512 of the object conversion part 510 may acquire video content. For example, the extraction part 512 of the object conversion part 510 may receive the video content from an external device. In another example, the extraction part 512 of the object conversion part 510 may receive the video content through a separate module for receiving video content from an external device. The video content may include a live video or live image content including one or more objects. Alternatively, the video content may be streaming content obtained by filming the real world and may include one or more objects.

After receiving the video content, the processor 334, when performing the functions of the extraction part 512 of the object conversion part 510 may extract motion data of an object included in the video content. In this example, the motion data may include at least one of position information, posture information, or motion information of the object. The object may include a "person" object, a "thing" object, etc., and may include an object having a specific form, shape, and color. The processor 334, when performing the functions of the extraction part 512 of the object conversion part 510, may determine a range and a degree of extraction of the motion data of the object according to a graphic style of the specific virtual environment, and extract the motion data of the object based on the result of determination. Specifically, the extraction part 512 of the object conversion part 510 may determine an extraction level based on the graphic style of the specific virtual environment. The processor 334, when performing the functions of the extraction part 512 of the object conversion part 510, may extract the motion data of the object based on the determined extraction level.

The processor 334, when performing the functions of the adjustment part 514 of the object conversion part 510, may modify the extracted motion data of the object based on an expressible range in the specific virtual environment. In other words, the adjustment part 514 of the object conversion part 510 may adjust the extracted motion data of the object, that is, the position, posture or motion of the object within the expressible range in the graphic style of the specific virtual environment. For example, motion data that is out of the expressible range in the specific virtual environment may be deleted or changed to another motion in the expressible range.

The processor 334, when performing the functions of the conversion part 516 of the object conversion part 510, may generate motion data (e.g., second motion data) in the specific virtual environment based on the motion data (e.g., first motion data) of the object extracted from the video content. In this example, the video content may include 2D format image and video content, but aspects are not limited thereto, and the video content may include image and video contents in 3D format (or 4D format). In addition, the motion data of the object extracted from the video content may include position information, posture information, or motion information of the object depicted in the video content. Further, the motion data in the specific virtual environment may include position information, posture information, or motion information of the object in the specific virtual environment. In this example, the specific virtual environment may represent a 3D-based specific virtual environment, but is not limited thereto, and may represent a 2D- or 4D-based specific virtual environment. The conversion part 516 of the object conversion part 510 may generate the motion data in the specific virtual environment using a machine learning model (e.g., a first machine learning model). For example, the motion data of the object extracted from the video content may be input to the machine learning model so that the motion data in the specific virtual environment may be generated.

The processor 334, when performing the functions of the conversion part 516 of the object conversion part 510, may apply the motion data in the specific virtual environment to the object in the specific virtual environment. Specifically, the conversion part 516 may generate an object in a specific virtual environment corresponding to the object included in the video content, based on the graphic style of the specific virtual environment. The processor 334, when performing the functions of the conversion part 516, may apply the motion data in the specific virtual environment to the generated object in the specific virtual environment. Accordingly, an object (e.g., a 3D object as a second object) representing the same motion as the motion of an object (e.g., a 2D object as a first object) included in the video content may be expressed in the specific virtual environment in the graphic style of the specific virtual environment.

The processor 334, when performing the functions of the background conversion part 520, may generate background data in a specific virtual environment necessary for the generation of virtual content, based on background data extracted from the video content.

The processor 334, when performing the functions of the extraction part 522 of the background conversion part 520, may acquire video content. For example, the extraction part 522 of the background conversion part 520 may receive the video content from an external device. In another example, the extraction part 522 of the background conversion part 520 may receive the video content through a separate module for receiving video content from an external device. In this case, the video content may include a live video or live image content in a 2D or 3D format including one or more objects. Alternatively, the video content may be streaming content obtained by filming the real world and may include one or more objects.

The processor 334, when performing the functions of the extraction part 522 of the background conversion part 520, may extract background data included in the video content. For example, the processor 334 may determine a range and a degree of extraction of the background data according to a graphic style of a specific virtual environment, and extract the background data based on the result of determination. Specifically, the processor 334 may determine an extraction level based on the graphic style of the specific virtual environment. The processor 334 may extract the background data based on the determined extraction level.

The processor 334, when performing the functions of the conversion part 524 of the background conversion part 520, may generate background data (e.g., second background data) in the specific virtual environment based on the background data (e.g., first background data) extracted from the video content. In this case, the background data extracted from the video content may include position information, shape information, etc. of the background depicted in the video content, but is not limited thereto. In addition, the background data in the specific virtual environment may include the position information, the shape information, etc. of the background in a specific 3D virtual environment, but is not limited thereto.

The processor 334, when performing the functions of the conversion part 524 of the background conversion part 520, may generate the background data in the specific virtual environment using a machine learning model (e.g., a first machine learning model). For example, the background data extracted from the video content may be input to the machine learning model so that the background data in the specific virtual environment may be generated.

The processor 334, when performing the functions of the virtual content generation part 530, may merge the object applying the motion data in the specific virtual environment with the background data in the specific virtual environment so as to generate virtual content in the specific virtual environment.

The processor 334, when performing the functions of the training part 540, may train the machine learning model with training data. FIG. 5 illustrates one training part 540 for convenience, but aspects are not limited thereto, and there may be one or more training parts corresponding to each of one or more machine learning models. The training part 540 may train and update a machine learning model (e.g., a first machine learning model) that generates motion data of an object in a specific virtual environment based on the motion data of an object included in the video content. For example, the first machine learning model may be trained with first training data and second training data so as to generate motion data of an object in a specific virtual environment. The first training data may include motion data for training, which may be extracted from video content for training. In addition, the second training data may include motion data for training in a first virtual environment.

According to another example, the processor 334, when performing the functions of the training part 540, may convert data associated with an object included in the video content into a graphic style of a specific virtual environment so as to train a machine learning model (e.g., a second machine learning model) for generating a 2D or 3D object. In this example, the second machine learning model may include a generator network that generates a 3D object by converting an object included in a live image into a graphic style of a specific virtual environment, and a discriminator network that determines whether the 3D object generated by the generator network is in the graphic style of the specific virtual environment. For example, the training part 540 may train the discriminator network using data associated with the specific virtual environment. In addition, the training part 540 may input a live image and a graphic style model of a specific virtual environment to train the generator network.

For convenience of description, the example of the method for generating by the processor the virtual content in the graphic style of the specific virtual environment based on the video content has been described above, but the virtual content is not limited to the graphic style of the specific virtual environment, and the processor 334 may generate the virtual content of a plurality of virtual environments having different graphic styles based on the video content.

The internal configuration of the processor 334 illustrated in FIG. 5 is only an example, and in some examples, configurations other than the illustrated internal configuration may be additionally included, or some configurations may be omitted, and some processes may be performed by other configurations or external systems. In addition, although the internal components of the processor 334 have been described separately for each function in FIG. 5, it does not necessarily mean that they are physically separated.

Figure 6:
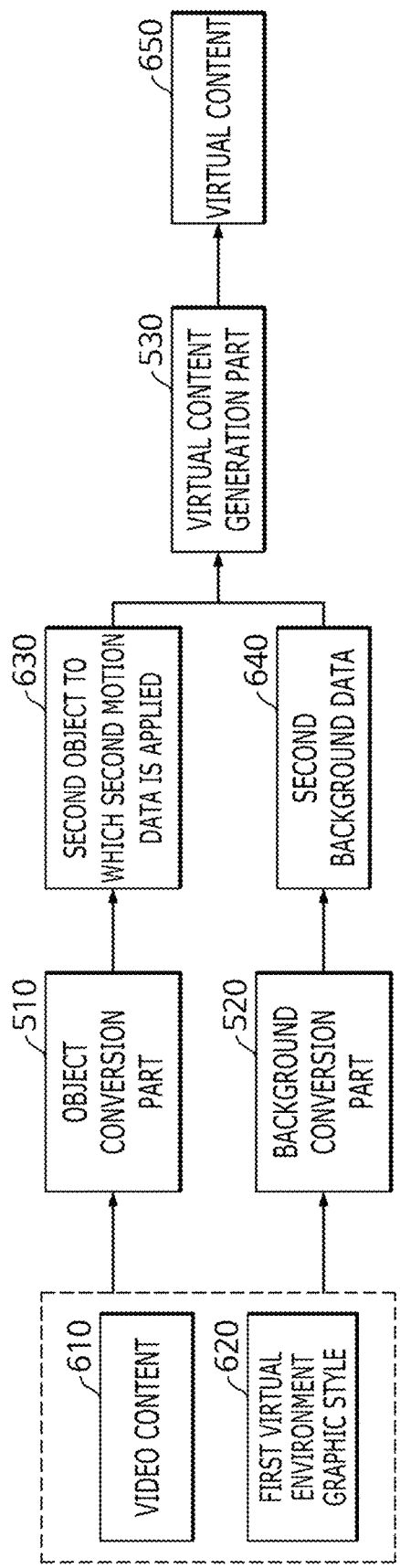
FIG. 6 is a diagram illustrating an example of a method for generating virtual content based on video content and a first virtual environment graphic style.

FIG. 6 is a diagram illustrating an example of a method for generating virtual content 650 based on video content 610 and a first virtual environment graphic style 620.

Referring to FIGS. 3-6, the processor 334 (or, alternatively, multiple processors) of the information processing system 230 may generate the virtual content 650 in the first virtual environment based on the video content 610 and the first virtual environment graphic style 620. In this case, the video content may include a live video or live image content in a 2D or 3D format including one or more objects. Alternatively, the video content may be streaming content obtained by filming the real world and may include one or more objects. In this example, the first virtual environment graphic style 620 may be a graphic style of a specific virtual environment of a plurality of virtual environments, and may represent a method of expression that transforms shape, size, proportion, texture, etc. of one or more objects depicted in the video content 610 and applies the same to the virtual content in the first virtual environment. In addition, the virtual content 650 in the first virtual environment may include 2D format or 3D format video content or image content, but is not limited thereto, and may include 4D format video content or image content.

The processor 334 may perform the functions of the object conversion part 510 to generate a second object 630 applying the second motion data based on the video content 610 and the first virtual environment graphic style 620. The second object 630 may represent an object in the first virtual environment that corresponds to an object (e.g., the first object) in the video content 610. The second object 630 may be a 2D object or a 3D object of the first virtual environment graphic style 620. In addition, the second motion data may represent motion data of the second object 630 in the first virtual environment that corresponds to motion data (e.g., first motion data) of an object included in the video content 610. A specific example of using the object conversion part 510 to generate the second object 630 applying the second motion data will be described below in detail with reference to FIG. 7.

The processor 334 may perform the functions of the background conversion part 520 to generate second background data 640 based on the video content 610 and the first virtual environment graphic style 620. The second background data 640 may represent background data in the first virtual environment that corresponds to background data (e.g., first background data) included in the video content 610. The second background data 640 may be 3D background data (e.g., time-series 3D background data) of the first virtual environment graphic style 620. A specific example of using the background conversion part 520 to generate the second background data 640 will be described below in detail with reference to FIG. 8.

The processor 334 may perform the functions of the virtual content generation part 530 to generate the virtual content 650 in the first virtual environment based on the second object 630 applying the second motion data and the second background data 640.

For convenience of description, the example of the method for generating by the processor the virtual content 650 in the graphic style of the first virtual environment based on the video content 610 has been described, but aspects are not limited thereto, and the processor 334 may generate virtual contents of a plurality of virtual environments having different graphic styles based on the video content 610. For example, the processor 334 may use not only the first virtual environment graphic style 620, but also a second virtual environment graphic style and a third virtual environment graphic style to generate virtual contents of the second virtual environment having the second virtual environment graphic style and virtual contents of the third virtual environment having the third virtual environment graphic style.

FIG. 6 illustrates an example in which the object conversion part 510 and the background conversion part 520 are configured separately, but the processor 334 may use only the object conversion part 510 to generate the virtual content 650 in the virtual environment. For example, the object generated by the object conversion part 510 may include a "person" object, a "thing" object, and a "background" object, and the "background" object which is motionless may have the motion information with a data value set to null or 0.

Figure 7:
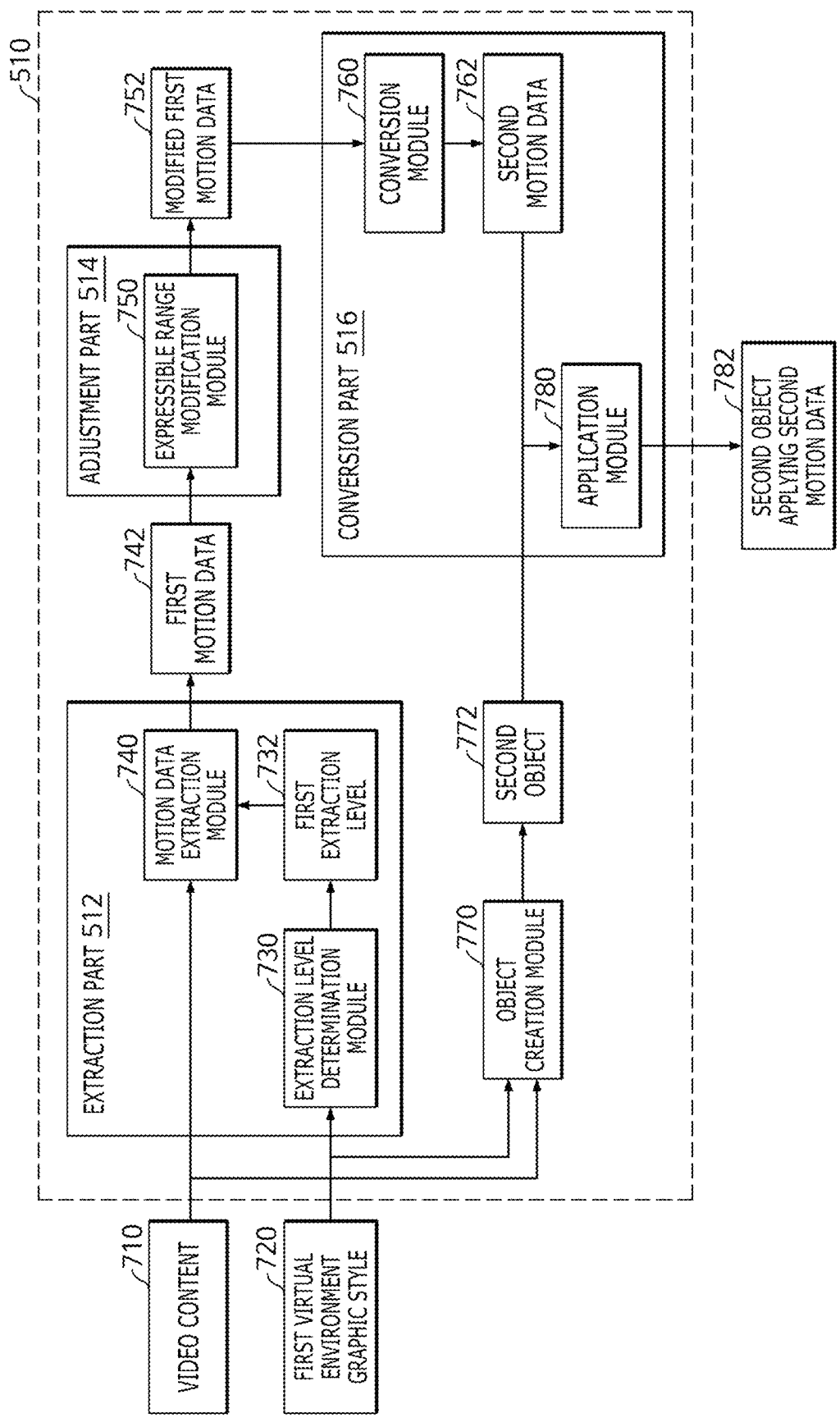
FIG. 7 is a diagram illustrating an example of a method for generating a second object applying second motion data based on the video content and the first virtual environment graphic style.

FIG. 7 is a diagram illustrating an example of a method for generating a second object 782 applying second motion data 762 based on video content 710 and a first virtual environment graphic style 720.

Referring to FIGS. 3-7, the processor 334 (or, alternatively, multiple processors) of the information processing system 230 may perform the functions of object conversion part 510 to generate a second object 782 by applying the second motion data 762 based on the video content 710 and the first virtual environment graphic style 720. As illustrated in FIGS. 5 and 7, when performing the functions of the object conversion part 510, the processor 334 may perform the functions of the extraction part 512, the adjustment part 514 and the conversion part 516 included within the object conversion part 510.

For example, the processor 334, when performing the functions of the extraction part 512, may extract first motion data 742 of a first object based on the video content 710 and the first virtual environment graphic style 720. The first motion data 742 may include at least one of position information, posture information, or motion information of the first object. Specifically, the processor 334 may use an extraction level determination module 730 to determine a first extraction level 732 based on the first virtual environment graphic style 720. For example, the processor 334 may determine a range and a degree of extraction of motion data of an object according to a graphic style of a specific virtual environment. The processor 334 may use a motion data extraction module 740 to extract the first motion data 742 of the first object based on the first extraction level. For example, if the first virtual environment graphic style 720 is a toy block style, only simple motion data such as simple arm rotation, neck rotation, and foot forward-backward motion may be extracted, whereas, if the first virtual environment graphic style 720 is similar to real life, detailed motion data such as motions of each joint, such as detailed finger motion, wrist motion, arm motion, neck motion, thigh motion, and calf motion, may be extracted.

The processor 334, when performing the functions of the adjustment part 514, may modify the extracted first motion data 742 of the first object based on the expressible range in the first virtual environment. Specifically, the processor 334 may use an expressible range correction module 750 to modify the first motion data 742 of the first object based on the expressible range in the first virtual environment so as to generate modified first motion data 752 of the first object. For example, if the first motion data 742 of the first object extracted from the video content 710 includes a 360-degree rotational motion of the arm, but the graphic style of the first virtual environment allows only 180-degree motion of the arm, the processor 334 may delete the motion data associated with the motion of the arm of 180 degrees or more, or change the motion data to another motion within the expressible range so as to generate the modified first motion data 752 of the first object. In certain examples, the operation of modifying the first motion data 742 by the adjustment part 514 may be omitted.

The processor 334, when performing the functions of the conversion part 516, may generate second motion data in the first virtual environment based on the modified first motion data 752 (or the first motion data 742) using the conversion module 760. The second motion data in the first virtual environment may represent motion data (e.g., time-series 2D or 3D motion data) in the first virtual environment, which corresponds to the first motion data of the first object included in the video content 710.

The processor 334 may input the first motion data to the first machine learning model to generate the second motion data in the first virtual environment. For example, the processor 334 may train a first machine learning model with the first and the second training data to generate motion data in the first virtual environment. In this case, the first training data may include motion data for training, which may be extracted from video content for training including live images, and the second training data may include motion data for training in the first virtual environment.

The first machine learning model may be a generative adversarial network (GAN). That is, it may include a generator network that generates motion data (or motion rules) in the first virtual environment, and a discriminator network that determines whether the motion data in the first virtual environment generated by the generator network is a motion in the expressible range. The training method of the first machine learning model is not limited to the examples described above, and various types of training methods for the machine learning model may be used. For example, the machine learning model may be generated using other supervised or unsupervised learning methods.

The processor 334 may apply second motion data 762 to a second object 772 in the first virtual environment corresponding to the first object so as to generate the second object 782 applying the second motion data. Specifically, the processor 334 may perform the functions of an object generation module 770 to generate the second object 772 in the first virtual environment based on the video content 710 and the first virtual environment graphic style 720. In this case, the second object 772 may correspond to the first object included in the video content 710 and may represent an object of the graphic style of the first virtual environment. The second object 772 may be a 2D or 3D object depending on the method of expression of the first virtual environment. The processor 334 may perform the functions of an application module 780 to apply the second motion data 762 to the second object 772 so as to generate the second object 782 applying the second motion data. FIG. 7 illustrates the object generation module 770 as a separate component from the conversion part 516, but the conversion part 516 may include the object generation module 770.

The processor 334, when performing the functions of the object generation module 770, may input data associated with the first object to a second machine learning model to generate a second object in the first virtual environment. For example, the second machine learning model may be a generative adversarial network (GAN).

That is, the second machine learning model may include a generator network that generates a 3D object by converting an object included in a live image into a graphic style of the first virtual environment, and a discriminator network that determines whether the 3D object generated by the generator network is in the graphic style of the first virtual environment. The training method of the second machine learning model is not limited to the examples described above, and various types of training methods for the machine learning model may be used.

For convenience of description, the example of the method for generating, by the processor 334, the second object 782 applying the second motion data in the first virtual environment based on the video content 710 has been described, but aspects are not limited thereto, and the processor 334 may generate an object applying motion data in a plurality of virtual environments having different graphic styles based on the video content 710.

Figure 8:
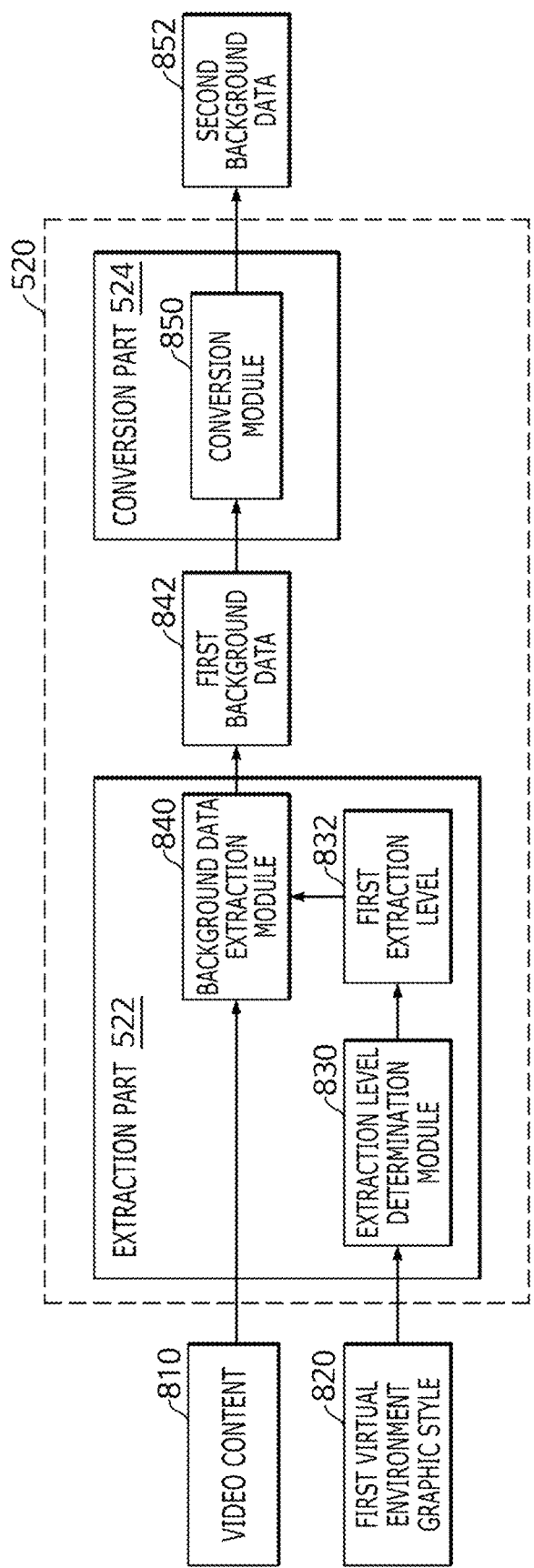
FIG. 8 is a diagram illustrating an example of a method for generating second background data based on the video content and the first virtual environment graphic style.

FIG. 8 is a diagram illustrating an example of a method for generating second background data 852 based on video content 810 and a first virtual environment graphic style 820.

Referring to FIGS. 3-8, as illustrated, the processor 334 (or, alternatively, multiple processors) of the information processing system 230 may perform the functions of the background conversion part 520 to generate the second background data 852 based on the video content 810 and the first virtual environment graphic style 820. As illustrated in FIGS. 5 and 8, when performing the functions of the background conversion part 520, the processor 334 may perform the functions of the extraction part 522 and the conversion part 524 included in the background conversion part 520.

For example, the processor 334, when performing the functions of the extraction part 522, may extract first background data 842 based on the video content 810 and the first virtual environment graphic style 820. In this case, the first background data may represent, among the data to be visually expressed included in the video content, the background data excluding the motion data of an object. Specifically, the processor 334 may use an extraction level determination module 830 to determine a third extraction level 832 based on the first virtual environment graphic style 820. For example, the processor 334 may determine a range and a degree of extraction of the background data according to a graphic style of a specific virtual environment. The processor 334 may use a background data extraction module 840 to extract the first background data 842 based on the third extraction level.

The processor 334, when performing the functions of the conversion part 524, may generate the second background data 852 in the first virtual environment based on the first background data 842 using the conversion module 850. In this case, the second background data 852 in the first virtual environment may represent background data (e.g., time-series 2D or 3D graphic data) in the first virtual environment, which corresponds to the first background data included in the video content 810. The processor 334 may use a machine learning model to generate the second background data 852 in the first virtual environment. For example, the processor 334 may input the video content 810 and the first virtual environment graphic style 820 into a machine learning model (e.g., the second machine learning model described above) to generate the second background data 852 in the first virtual environment.

For convenience of description, the example of the method for generating, by the processor 334, the second background data 852 in the first virtual environment based on the video content 810 has been described, but aspects are not limited thereto, and the processor 334 may generate background data in a plurality of virtual environments having different graphic styles based on the video content 810.

Figure 9:
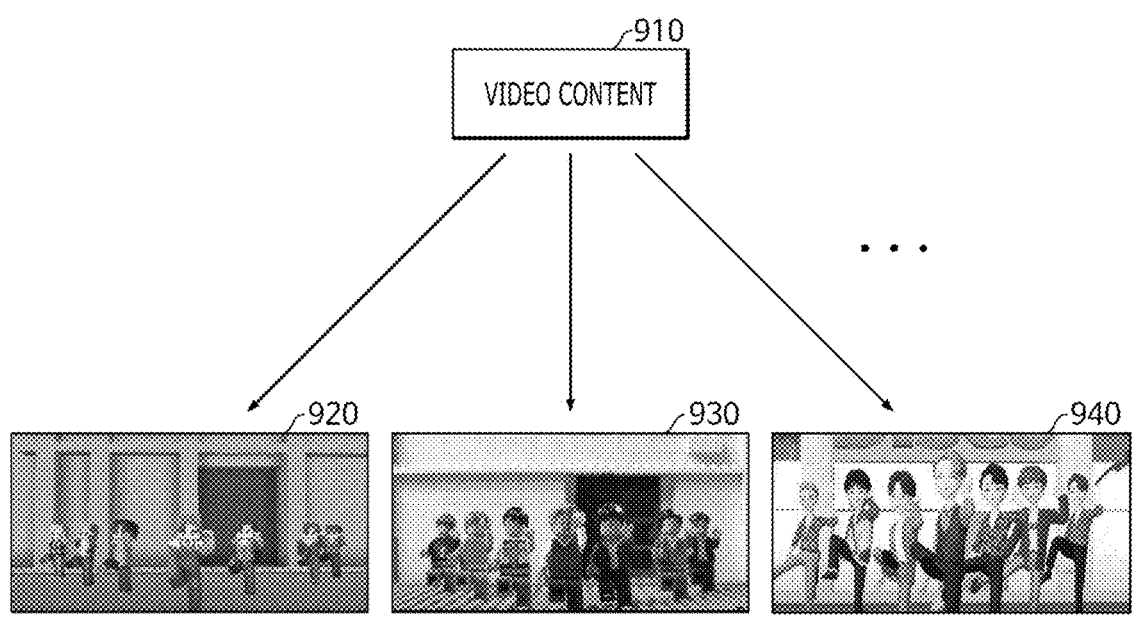
FIG. 9 is a diagram illustrating examples of virtual content in different virtual environments based on 2D video content.

FIG. 9 is a diagram illustrating examples of virtual contents 920, 930, and 940 in different virtual environments based on 2D video content 910.

Referring to FIG. 9, the processor 334 (or, alternatively, multiple processors) of the information processing system 230 may generate the virtual contents 920, 930, and 940 for a plurality of virtual environments having different 3D graphic styles by using the 2D video content 910. For example, the 2D video content 910 may be a live video obtained by filming a scene in which seven "person" objects in the real world are dancing. The processor 334 may generate the virtual contents 920, 930, and 940 for a plurality of virtual environments including an object having a motion corresponding to the object depicted in the 2D video content 910. In this case, each of the virtual contents 920, 930, and 940 for the plurality of virtual environments may be associated with different 3D graphic styles.

The virtual contents for the plurality of virtual environments having different 3D graphic styles may be video contents expressing the shape, size, ratio, texture, etc. of an object depicted in a live video with different methods of expression from each other. For example, as illustrated, the first virtual content 920 may be virtual content for a virtual environment having a 3D graphic style in a dot design format, which is a method of expression that emphasizes points, lines, and planes of an object. In addition, the second virtual content 930 may be virtual content for a virtual environment having a 3D graphic style in which an object is expressed in the form of a toy block. In addition, the third virtual content 940 may be virtual content for a virtual environment having a 3D graphic style expressed in a cartoon style. With this configuration, the processor 334 may generate virtual contents for virtual environments having various 3D graphic styles based on one live image or live video with little cost and effort.

FIG. 9 illustrates the virtual contents for the virtual environment having three 3D graphic styles, but aspects are not limited thereto, and virtual contents for the virtual environment having three or more 3D graphic styles may be generated based on one 2D video content 910. In addition, FIG. 9 illustrates the example of generating different virtual contents for the virtual environment having the 3D graphic style based on the 2D video content 910, but aspects are not limited thereto, and different virtual contents for a virtual environment having a 2D graphic style may be generated based on the 2D video content 910, or different virtual contents for a virtual environment having a 3D graphic style or a 2D graphic style may be generated based on the 3D video content.

Figure 10:
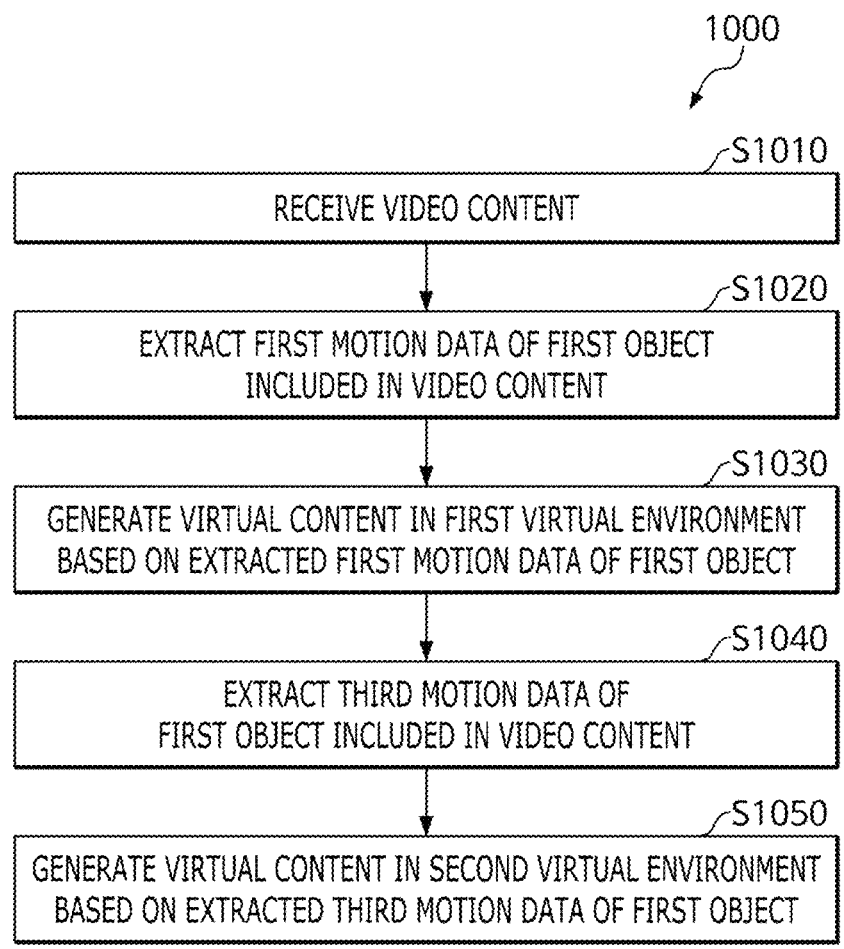
FIG. 10 is a flowchart illustrating an example of a method for generating virtual content.

FIG. 10 is a flowchart illustrating an example of a method 1000 for generating virtual content.

Referring to FIG. 10, the method 1000 for generating virtual content may be performed by a processor, such as the processor 334 (or, alternatively, multiple processors) of the information processing system 230.

As illustrated, in operation S1010, the method 1000 for generating virtual content may be initiated by the processor 334 receiving video content.

In operation S1020, the processor 334 may extract first motion data of a first object included in the video content. In this case, the first motion data may include at least one of position information, posture information, or motion information of the first object. Specifically, the processor 334 may determine a first extraction level based on a graphic style of a first virtual environment. The processor 334 may extract the first motion data of the first object based on the determined first extraction level. Additionally, the processor 334 may modify the extracted first motion data of the first object based on the expressible range in the first virtual environment.

In operation S1030, the processor 334 may convert the video content in accordance with the first virtual environment based on the extracted first motion data of the first object so as to generate virtual content in the first virtual environment. The processor 334 may generate second motion data in the first virtual environment based on the first motion data. For example, the second motion data in the first virtual environment may be generated by inputting the first motion data to the first machine learning model. In this case, the first machine learning model may be a machine learning model trained with first training data and second training data to generate the motion data in first virtual environment, and the first training data may include the motion data for training, which may be extracted from video content for training, and the second training data may include motion data for training in the first virtual environment.

The processor 334 may generate a second object in a first virtual environment, which corresponds to the first object, based on the graphic style of the first virtual environment. The processor 334 may apply the second motion data to the second object. In this case, the second object may be an object in the graphic style of the first virtual environment. For example, the processor 334 may input data associated with the first object into a second machine learning model. The second machine learning model may include a generator network that generates a 3D object by converting an object included in a live image into a graphic style of the first virtual environment, and a discriminator network that determines whether the 3D object generated by the generator network is in the graphic style of the first virtual environment.

In operation S1040, the processor 334 may extract third motion data of the first object included in the video content, at S1040.

In operation S1050, the processor 334 may convert the video content in accordance with the second virtual environment based on the extracted third motion data of the first object so as to generate virtual content in the second virtual environment. In this case, the graphic style of the first virtual environment and the graphic style of the second virtual environment may be different from each other. The first motion data and the third motion data extracted from the video content may be different from or identical to each other.

Specifically, the processor 334 may determine a second extraction level based on the graphic style of the second virtual environment, and extract the third motion data of the first object based on the determined second extraction level. The processor 334 may generate fourth motion data in the second virtual environment based on the third motion data. In addition, the processor 334 may generate a third object in the second virtual environment, which corresponds to the first object, based on the graphic style of the second virtual environment. The processor 334 may apply the fourth motion data to the third object. In this case, the third object may be a 3D object in the graphic style of the second virtual environment.

The processor 334 may generate background data in the first virtual environment based on the video content. The processor 334 may extract first background data included in the video content. For example, the processor 334 may determine the third extraction level based on the graphic style of the first virtual environment. The processor 334 may extract the first background data from the video content based on the determined third extraction level. In addition, the processor 334 may generate second background data in the first virtual environment based on the first background data. In this case, the second background data may be 3D background data in the graphic style of the first virtual environment. The processor 334 may generate virtual content in the first virtual environment based on the extracted first motion data of the first object and the second background data.

The processor 334 may extract third background data included in the video content. Specifically, the processor 334 may determine a fourth extraction level based on the graphic style of the second virtual environment. The processor 334 may extract the third background data from the video content based on the determined fourth extraction level. The processor 334 may generate fourth background data in the second virtual environment based on the third background data. In this case, the fourth background data may be 3D background data in the graphic style of the second virtual environment. The processor 334 may generate virtual content in the first virtual environment based on the extracted first motion data of the first object and the second background data.

The flowcharts of FIG. 10 and the above description are merely examples, and may be implemented in various ways in other examples. For example, the order of each operations may be changed, one or more operations may be added, or one or more operations may be omitted. As another example, one or more operations may be performed by different configurations.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing parts used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic parts designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method of generating virtual content by one or more processors, the method comprising:
   receiving video content;
   extracting, by the one or more processors, first motion data of a first object included in the video content; and
   converting, by the one or more processors, the video content in accordance with a first virtual environment based on the first motion data of the first object to generate the virtual content in the first virtual environment,
   wherein the generating the virtual content in the first virtual environment comprises:
   generating second motion data in the first virtual environment based on the first motion data,
   wherein the generating the second motion data in the first virtual environment comprises:
   inputting the first motion data to a first machine learning model,
   wherein the first machine learning model is a machine learning model trained with first training data and second training data to generate the second motion data in the first virtual environment,
   the first training data includes motion data extracted from the video content for training, and
   the second training data includes motion data for training in the first virtual environment.

2. The method according to claim 1, wherein the first motion data includes at least one of position information, posture information, or motion information of the first object.

3. The method according to claim 1, wherein the extracting the first motion data comprises:
   determining a first extraction level based on a graphic style of the first virtual environment; and
   extracting the first motion data of the first object based on the first extraction level.

4. The method according to claim 3, further comprising:
   modifying the first motion data of the first object based on an expressible range in the first virtual environment.

5. The method according to claim 1, wherein the generating the virtual content in the first virtual environment further comprises:
   generating, in the first virtual environment, a second object that corresponds to the first object, the second object being an object in a graphic style of the first virtual environment; and
   applying the second motion data to the second object.

6. The method according to claim 1, further comprising:
   extracting third motion data of the first object included in the video content; and
   converting the video content in accordance with a second virtual environment based on the third motion data to generate the virtual content in the second virtual environment.

7. The method according to claim 6, wherein
   a graphic style of the first virtual environment, and a graphic style of the second virtual environment are different from each other, and
   the first motion data and the third motion data are different from each other.

8. The method according to claim 6, wherein the extracting the third motion data comprises:
   determining a second extraction level based on a graphic style of the second virtual environment; and
   extracting the third motion data of the first object based on the second extraction level.

9. The method according to claim 6, wherein the generating the virtual content in the second virtual environment comprises:
   generating fourth motion data in the second virtual environment based on the third motion data.

10. The method according to claim 9, wherein the generating the virtual content in the second virtual environment comprises:
    generating, in the second virtual environment, a third object that corresponds to the first object, the third object being an object in a graphic style of the second virtual environment; and
    applying the fourth motion data to the third object.

11. The method according to claim 6, further comprising:
    extracting third background data included in the video content; and
    generating, in the second virtual environment, fourth background data based on the third background data, the fourth background data being 3D background data in a graphic style of the second virtual environment, wherein
    the generating the virtual content in the second virtual environment includes generating the virtual content in the second virtual environment based on the third motion data of the first object and the fourth background data.

12. The method according to claim 11, wherein the extracting the third background data comprises:
    determining a fourth extraction level based on the graphic style of the second virtual environment; and
    extracting the third background data from the video content based on the fourth extraction level.

13. The method according to claim 1, further comprising:
    extracting first background data included in the video content; and
    generating, in the first virtual environment, second background data based on the first background data, the second background data being 3D background data in a graphic style of the first virtual environment, wherein the generating the virtual content in the first virtual environment includes generating the virtual content in the first virtual environment based on the first motion data of the first object and the second background data.

14. The method according to claim 13, wherein the extracting the first background data comprises:
determining a third extraction level based on the graphic style of the first virtual environment; and
extracting the first background data from the video content based on the third extraction level.

15. A non-transitory computer-readable recording medium storing instructions that, when executed by a computer, configure the computer to execute the method according to claim 1.

16. A method of generating virtual content by one or more processors, the method comprising:
receiving video content;
extracting, by the one or more processors, first motion data of a first object included in the video content; and
converting, by the one or more processors, the video content in accordance with a first virtual environment based on the first motion data of the first object to generate the virtual content in the first virtual environment,
wherein the generating the virtual content in the first virtual environment comprises:
generating second motion data in the first virtual environment based on the first motion data,
generating, in the first virtual environment, a second object that corresponds to the first object, the second object being an object in a graphic style of the first virtual environment; and
applying the second motion data to the second object, wherein the generating the second object in the first virtual environment comprises:
inputting data associated with the first object into a second machine learning model, wherein the second machine learning model includes a generator network that converts an object included in a live image into the graphic style of the first virtual environment so as to generate a three-dimensional (3D) object, and a discriminator network that determines whether the 3D object generated by the generator network is in the graphic style of the first virtual environment.

17. An information processing system, comprising:
a communication module;
a memory; and
one or more processors connected to the memory and configured to execute one or more computer-readable programs included in the memory to configure the information processing system to,
receive video content;
extract first motion data of a first object included in the video content; and
convert the video content in accordance with a first virtual environment based on the first motion data of the first object to generate virtual content in the first virtual environment,
wherein the generating the virtual content in the first virtual environment comprises:
generating second motion data in the first virtual environment based on the first motion data,
wherein the generating the second motion data in the first virtual environment comprises:
inputting the first motion data to a first machine learning model,
wherein the first machine learning model is a machine learning model trained with first training data and second training data to generate the second motion data in the first virtual environment,
the first training data includes motion data extracted from the video content for training, and
the second training data includes motion data for training in the first virtual environment.

* * * * *